(12) United States Patent
Ito et al.

(10) Patent No.: US 12,226,752 B2
(45) Date of Patent: Feb. 18, 2025

(54) METHOD FOR REGENERATING HIGHLY WATER-ABSORBING POLYMER, METHOD FOR PRODUCING HIGHLY WATER-ABSORBING RECYCLED POLYMER, AND USE OF ALKALI METAL ION SOURCE

(71) Applicant: Unicharm Corporation, Ehime (JP)

(72) Inventors: Ryusei Ito, Sapporo (JP); Haruna Onodera, Sapporo (JP); Naoyuki Funamizu, Sapporo (JP); Takayoshi Konishi, Kanonji (JP); Kouichi Yamaki, Kanonji (JP)

(73) Assignee: UNICHARM CORPORATION, Ehime (JP)

( * ) Notice: Subject to any disclaimer, the term of this patent is extended or adjusted under 35 U.S.C. 154(b) by 1237 days.

(21) Appl. No.: 16/966,884

(22) PCT Filed: Feb. 5, 2019

(86) PCT No.: PCT/JP2019/004116
§ 371 (c)(1),
(2) Date: Aug. 1, 2020

(87) PCT Pub. No.: WO2019/151538
PCT Pub. Date: Aug. 8, 2019

(65) Prior Publication Data
US 2021/0039072 A1 Feb. 11, 2021

(30) Foreign Application Priority Data

Feb. 5, 2018 (JP) ................................ 2018-018664
Aug. 20, 2018 (JP) ................................ 2018-154170

(51) Int. Cl.
*B01J 20/26* (2006.01)
*B01J 20/34* (2006.01)

(52) U.S. Cl.
CPC ......... *B01J 20/3475* (2013.01); *B01J 20/261* (2013.01); *B01J 20/3425* (2013.01); *B01J 20/3483* (2013.01)

(58) Field of Classification Search
None
See application file for complete search history.

(56) References Cited

U.S. PATENT DOCUMENTS

2014/0230322 A1 8/2014 Zhang et al.
2015/0045461 A1 2/2015 Funamizu et al.

FOREIGN PATENT DOCUMENTS

| | | |
|---|---|---|
| EP | 3064644 A1 | 9/2016 |
| EP | 3238840 A1 | 11/2017 |
| JP | 2003225645 A | 8/2003 |
| JP | 2003326161 A | 11/2003 |
| JP | 2013198862 A | 10/2013 |
| JP | 2016123973 A | 7/2016 |
| WO | 2015064209 A1 | 5/2015 |

OTHER PUBLICATIONS

Extended European Search Report for European Application No. EP19748325.8, mailed Dec. 4, 2020, 6 pgs.
English Abstract and Machine Translation for Japanese Publication No. 2003-326161 A, published Nov. 18, 2003, 26 pgs.
English Abstract and Machine Translation for Japanese Publication No. 2013-198862 A, published Oct. 3, 2013, 11 pgs.
English Abstract and Machine Translation for Japanese Publication No. 2016-123973 A, published Jul. 11, 2016, 16 pgs.
English Abstract and Machine Translation for Japanese Publication No. 2003-225645 A, published Aug. 12, 2003, 12 pgs.
PCT International Search Report dated May 7, 2019 for Intl. App. No. PCT/JP2019/004116, from which the instant application is based, 2 pgs.

*Primary Examiner* — Tanisha Diggs
(74) *Attorney, Agent, or Firm* — Fredrikson & Byron, P.A.

(57) ABSTRACT

The purpose of the present disclosure is to provide a method for regenerating a highly water-absorbing polymer that has been deactivated by an acid, the method enabling formation of a highly water-absorbing recycled polymer having predetermined water absorption properties. The regeneration method according to the present disclosure is configured as follows. This method regenerates a highly water-absorbing polymer that has been deactivated by an acid into a highly water-absorbing recycled polymer having predetermined water absorption properties. The method includes: a preparation step (S1) for preparing a highly water-absorbing polymer which has an acid group and which has been deactivated by an acid; a highly water-absorbing recycled polymer-forming step (S3) for adding an alkali metal ion source, which can supply an alkali metal ion, to a regeneration-use aqueous solution that contains the highly water-absorbing polymer that has been deactivated by an acid, and forming the highly water-absorbing recycled polymer in a wet state from the highly water-absorbing polymer that has been deactivated by the acid; and a drying step for drying the highly water-absorbing recycled polymer in a wet state and forming the highly water-absorbing recycled polymer having the predetermined water absorption properties.

7 Claims, 5 Drawing Sheets

METHOD FOR REGENERATING HIGHLY WATER-ABSORBING POLYMER, METHOD FOR PRODUCING HIGHLY WATER-ABSORBING RECYCLED POLYMER, AND USE OF ALKALI METAL ION SOURCE

RELATED APPLICATIONS

This application is a 35 U.S.C. 371 national phase filing from International Application No. PCT/JP2019/004116, filed Feb. 5, 2019, which claims priority to Japanese Application No. 2018-154170, filed Aug. 20, 2018 and Japanese Application No. 2018-018664, filed Feb. 5, 2018, the contents of which are incorporated herein by reference.

FIELD

The present invention relates to a method of regenerating superabsorbent polymers which have been inactivated by an acid into superabsorbent recycled polymers which have a predetermined absorption property, a method of manufacturing superabsorbent recycled polymers which have a predetermined absorption property from a used sanitary product which includes pulp fibers and superabsorbent polymers, and a use of an alkali metal ion supply source for regenerating superabsorbent polymers which have been inactivated by an acid into superabsorbent recycled polymers which have a predetermined absorption property.

BACKGROUND

Methods of recovering superabsorbent polymers from a used sanitary product are known.

For example, in Patent Literature 1, a regenerating method of absorbent resin in which the absorbent resin which have absorbed absorption liquid from a used bodily fluid absorbent article is extracted, washed and is subjected to a dehydration treatment, characterized in that the washing and/or the dehydration treatment includes an operation of letting the absorbent resin discharge the absorbed absorption liquid, is disclosed.

Further, paragraph [0037] of Patent Literature 1 discloses that the absorbent resin which has been subjected to the above-exemplified regeneration treatment may be applied to the usage of for example an absorbent article, etc., as the regenerated absorbent resin of the present invention (hereinbelow, the regenerated absorbent resin is referred to the absorbent agent of the present invention) as it is, however, it is preferable that a basic compound is added again so as to adjust the pH, if necessary.

CITATION LIST

Patent Literature

[PTL 1] Japanese Unexamined Patent Publication No. 2003-326161

SUMMARY

Technical Problem

In recycling a used sanitary product, for example, in a case in which a disposable diaper, a light incontinence pad, a sanitary napkin, and a panty liner, etc., are recycled altogether, superabsorbent polymers in which the absorption property is relatively high (for example, those which are included in a disposable diaper), and superabsorbent polymers in which the absorption property is relatively low but is excellent in the gel strength at wet state (for example, those which are included in a light incontinence pad, a sanitary napkin, and a panty liner, etc.) are to be mixed in the superabsorbent polymers to be generated, whereby there is a tendency that superabsorbent polymers in which the absorption property is relatively high and superabsorbent polymers in which the absorption property is relatively low are included also in the superabsorbent polymers to be regenerated.

Further, even in a case in which the sanitary product to be recycled is limited only to for example, disposable diapers, since generally, disposable diapers manufactured by different manufacturers include superabsorbent polymers with different absorption properties, in principle, there is a tendency that superabsorbent polymers to be regenerated and the regenerated superabsorbent polymers include superabsorbent polymers with different absorption properties.

Accordingly, superabsorbent polymers which are regenerated from a used sanitary product are generally used for usages with wide tolerance degree of absorption property (for example, soil conditioning agent).

In a case in which superabsorbent polymers which are regenerated from a used sanitary product are used for usages with narrow tolerance degree of absorption property, for example, in a case of reusing the same for a sanitary product, in order not to give an adverse effect to the absorption property of the sanitary product, it is conceivable that it is necessary to use the regenerated superabsorbent polymers by mixing the same with a low ratio (for example, 10 to 30 mass % of the superabsorbent polymers included in a sanitary product) into virgin superabsorbent polymers. Incidentally, currently, business of reusing superabsorbent polymers which have been regenerated from used sanitary products for a sanitary product is not generally done.

In the regenerating method disclosed in Patent Literature 1, "the regenerating method" which includes the predetermined "washing" and "dehydration treatment" is performed, whereby the regeneration of the absorbent resin is completed, and the basic compound disclosed in paragraph [0037] of Patent Literature 1 is added merely for the purpose of adjusting pH of the absorbent resin which exhibits acidity caused by an acidic compound added in the "dehydration treatment" in order to shrink the gel, to be specific, for the purpose of neutralization, and the basic compound is not for adjusting the absorption property of the absorbent resin to be regenerated.

Accordingly, since the absorbent resin which regenerated by the regenerating method disclosed in Patent Literature 1 is not adjusted with the absorption property, in order to reuse the same for a sanitary product, it is necessary to use the same by being mixed with a low ratio, for example, with 10 to 30 mass %, in order not to inhibit the absorption property of a sanitary product.

As described above, the purpose of the present disclosure is to provide a regenerating method of superabsorbent polymers which have been inactivated by an acid, and is capable of forming superabsorbent recycled polymers which have a predetermined absorption property.

Solution to Problem

The present inventor found out that a method of regenerating superabsorbent polymers which have been inactivated by an acid into superabsorbent recycled polymers which have a predetermined absorption property, the method comprising: a preparation step of preparing the superabsorbent polymers having an acid group and having been inactivated by the acid, a superabsorbent recycled polymer formation step of forming wet-state superabsorbent recycled polymers from the superabsorbent polymers which have been inactivated by the acid, by adding an alkali metal ion supply source which is capable of supplying an alkali metal ion to an aqueous solution for regeneration which includes the superabsorbent polymers which have been inactivated by the acid, and a drying step of forming the superabsorbent recycled polymers which have the predetermined absorption property by drying the wet-state superabsorbent recycled polymers is the solution to the problem.

Advantageous Effects of Invention

The regenerating method of superabsorbent polymers which have been inactivated by an acid according to the present disclosure can form superabsorbent recycled polymers which have a predetermined absorption property.

DESCRIPTION OF EMBODIMENTS

Definitions

Figure 1:
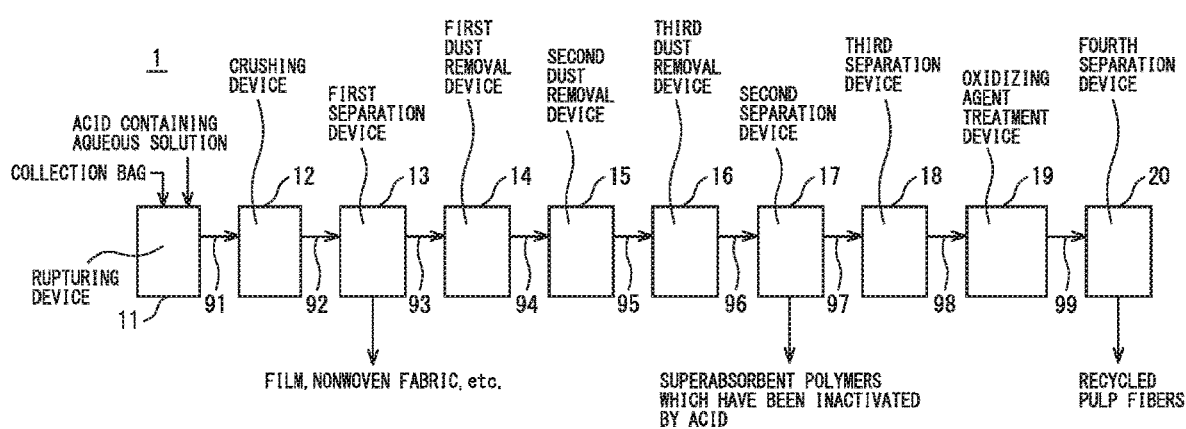
FIG. 1 is a block diagram of the system 1 so as to perform the manufacturing method, the regenerating method, and the use according to one embodiment of the present disclosure.

"The Absorption Magnification"
In the present description, "the absorption magnification" is measured as follows.
(1) The superabsorbent polymers or superabsorbent recycled polymers in a wet state are placed in a mesh and are suspended for 5 minutes, whereby moisture which is attached to the surface thereof is removed, and the mass thereof before drying: $m_1$ (g) is measured.
(2) The superabsorbent polymers or superabsorbent recycled polymers in which the moisture attached to the surface is removed are dried at 50° C. for 180 minutes, and the mass thereof after drying: $m_2$ (g) is measured.
(3) The absorption magnification (g/g) is calculated by the following formula.

Absorption magnification (g/g)=$m_1/m_2$

"Inactivation" with Regard to Superabsorbent Polymers
In the present description, "inactivation" with regard to superabsorbent polymers (SAPs) means adjusting the superabsorbent polymers which retain excrement, etc., so as to have an absorption magnification of preferably 50 times or less, more preferably 30 times or less, and even more preferably 25 times or less, for example, letting the superabsorbent polymers release the retained excrement, and suppressing absorption of the an acid containing aqueous solution, etc.

More specifically, the present disclosure relates to the following aspects.
[Aspect 1]
A method of regenerating superabsorbent polymers which have been inactivated by an acid into superabsorbent recycled polymers which have a predetermined absorption property, the method comprising:
   a preparation step of preparing the superabsorbent polymers having an acid group and having been inactivated by the acid,
   a superabsorbent recycled polymer formation step of farming wet-state superabsorbent recycled polymers from the superabsorbent polymers which have been inactivated by the acid, by adding an alkali metal ion supply source which is capable of supplying an alkali metal ion to an aqueous solution for regeneration which includes the superabsorbent polymers which have been inactivated by the acid, and
   a drying step of forming the superabsorbent recycled polymers which have the predetermined absorption property by drying the wet-state superabsorbent recycled polymers.

The above-mentioned regenerating method includes the predetermined superabsorbent recycled polymer formation step and drying step, whereby the superabsorbent recycled polymers to be regenerated can be used for various usages which ask for different absorption properties and an absorption property with a narrow tolerance degree. Further, the regenerated superabsorbent recycled polymers can be used in a high ratio for various usages.
[Aspect 2]
The method according to aspect 1, wherein
   the predetermined absorption property is any value of an absorption magnification of 100 to 400 times (g/g) with respect to a deionization.

According to the above-mentioned regenerating method, the predetermined absorption property is any value of the predetermined absorption magnification, whereby the superabsorbent recycled polymers can be used both for a usage in which superabsorbent polymers with a low absorption property is preferable (for example, a light incontinence pad, a sanitary napkin, etc.) and for a usage in which superabsorbent polymers with a high absorption property is preferable (for example, a disposable diaper, etc.).
[Aspect 3]
The method according to aspect 1 or 2, wherein
   the alkali metal ion supply source is a hydroxide of an alkali metal or a salt of a hydroxide of an alkali metal and an acid which has an acid dissociation constant larger than that of the acid group of the superabsorbent polymers.

According to the above-mentioned regenerating method, the alkali metal ion supply source is the predetermined compound, whereby the absorption property of the superabsorbent recycled polymers to be regenerated can be easily adjusted.
[Aspect 4]
The method according to any one of aspects 1 to 3, wherein
   the alkali metal ion is selected from a group of a lithium ion, a sodium ion, a potassium ion, and any combination thereof.

According to the above-mentioned regenerating method, the alkali metal ion is selected from the predetermined group, whereby the superabsorbent recycled polymers are excellent in the absorption property.

[Aspect 5]

The method according to any one of aspects 1 to 4, wherein
the predetermined absorption property is adjusted by controlling a pH of the aqueous solution for regeneration.

According to the above-mentioned regenerating method, the predetermined absorption property is adjusted by controlling the pH of the aqueous solution for regeneration, whereby even in a case in which the amount of the superabsorbent polymers to be regenerated is not known, the absorption property of the superabsorbent recycled polymers can be easily adjusted.

[Aspect 6]

The method according to aspect 5, wherein
the pH of the aqueous solution for regeneration is adjusted to 5.0 to 9.0 (at 25° C.).

According to the above-mentioned regenerating method, the pH of the aqueous solution for regeneration is adjusted to the predetermined range, whereby the absorption property of the superabsorbent recycled polymers can be easily adjusted for those from a usage in which superabsorbent polymers with a low absorption property is preferable to a usage in which superabsorbent polymers with a high absorption property is preferable.

[Aspect 7]

A method of manufacturing superabsorbent recycled polymers which have a predetermined absorption property from a used sanitary product which includes pulp fibers and superabsorbent polymers, the method comprising:
an inactivation step of forming superabsorbent polymers which have been inactivated by an acid by immersing, in an acid containing aqueous solution which includes the acid, a sanitary product configurational material which configures the sanitary product which includes the pulp fibers and the superabsorbent polymers having an acid group,
a superabsorbent recycled polymer formation step of forming wet-state superabsorbent recycled polymers from the superabsorbent polymers which have been inactivated by the acid, by adding an alkali metal ion supply source which is capable of supplying an alkali metal ion to an aqueous solution for regeneration which includes the superabsorbent polymers which have been inactivated by the acid, and
a drying step of forming the superabsorbent recycled polymers which have the predetermined absorption property by drying the wet-state superabsorbent recycled polymers.

The above-mentioned manufacturing method includes the predetermined superabsorbent recycled polymer for nation step and drying step, whereby the superabsorbent recycled polymers to be manufactured can be used for various usages which ask for different absorption properties and an absorption property with a narrow tolerance degree. Further, the superabsorbent recycled polymers to be manufactured can be used in a high ratio for various usages.

[Aspect 8]

The method according to aspect 7, wherein
the alkali metal ion supply source is a hydroxide of an alkali metal or a salt of a hydroxide of an alkali metal and an acid which has an acid dissociation constant larger than that of the acid group of the superabsorbent polymers.

According to the above-mentioned manufacturing method, the alkali metal ion supply source is the predetermined compound, whereby the absorption property of the superabsorbent recycled polymers to be regenerated can be easily adjusted.

[Aspect 9]

The method according to aspect 7 or 8, wherein
the predetermined absorption property is adjusted by controlling a pH of the aqueous solution for regeneration.

According to the above-mentioned manufacturing method, the predetermined absorption property is adjusted by controlling the pH of the aqueous solution for regeneration, whereby even in a case in which the amount of the superabsorbent polymers to be recycled is not known, the absorption property of the superabsorbent recycled polymers can be easily adjusted.

[Aspect 10]

The method according to aspect 9, wherein
the pH of the aqueous solution for regeneration is adjusted to 5.0 to 9.0 (at 25° C.).

According to the above-mentioned manufacturing method, the pH of the aqueous solution for regeneration is adjusted to the predetermined range, whereby the absorption property of the superabsorbent recycled polymers can be easily adjusted for those from a usage in which superabsorbent polymers with a low absorption property is preferable to a usage in which superabsorbent polymers with a high absorption property is preferable.

[Aspect 11]

The method according to aspect 9 or 10, wherein
in the superabsorbent recycled polymer formation step, the acid containing aqueous solution is used as the aqueous solution for regeneration, and the pH of the aqueous solution for regeneration is adjusted to 5.0 to 7.0 (at 25° C.).

According to the above-mentioned manufacturing method, in the superabsorbent recycled polymer formation step, the acid containing aqueous solution is used as the aqueous solution for regeneration, and the pH of the aqueous solution for regeneration is adjusted to the predetermined range, whereby superabsorbent recycled polymers which are preferable to the usage in which superabsorbent polymers with a low absorption property is preferable can be manufactured easily.

[Aspect 12]

The method according to aspect 9 or 10, wherein
the aqueous solution for regeneration is a neutral aqueous solution or an alkaline aqueous solution, and
in the superabsorbent recycled polymer formation step, the superabsorbent polymers which have been inactivated by the acid are immersed in the aqueous solution for regeneration, and the pH of the aqueous solution for regeneration is adjusted to higher than 7.0 and 9.0 or lower.

According to the above-mentioned manufacturing method, the aqueous solution for regeneration is a neutral aqueous solution or an alkaline aqueous solution, and in the superabsorbent recycled polymer formation step, the superabsorbent polymers which have been inactivated by the acid are immersed in the aqueous solution for regeneration, and the pH of the aqueous solution for regeneration is adjusted to the predetermined range, whereby superabsorbent recycled polymers which are preferable to the usage in which superabsorbent polymers with a high absorption property is preferable can be manufactured by reducing the amount of the alkali metal ion supply source, and easily.

[Aspect 13]

A use of an alkali metal ion supply source which is capable of supplying an alkali metal ion for regenerating superabsorbent polymers which have been inactivated by an acid into superabsorbent recycled polymers which have a predetermined absorption property, the use comprising:
  a superabsorbent recycled polymer formation step of forming wet-state superabsorbent recycled polymers from the superabsorbent polymers which have been inactivated by the acid, by adding the alkali metal ion supply source to an aqueous solution for regeneration which includes the superabsorbent polymers having an acid group and having been inactivated by the acid.

The above-mentioned use includes the predetermined superabsorbent recycled polymer formation step, whereby the superabsorbent recycled polymers to be formed can be used for various usages which ask for different absorption properties and an absorption property with a narrow tolerance degree. Further, the superabsorbent recycled polymers to be regenerated can be used in a high ratio for various usages.

[Aspect 14]

The use according to aspect 13, wherein
  the alkali metal ion supply source is a hydroxide of an alkali metal or a salt of a hydroxide of an alkali metal and an acid which has an acid dissociation constant larger than that of the acid group of the superabsorbent polymers.

According to the above-mentioned use, the alkali metal ion supply source is the predetermined compound, whereby the absorption property of the superabsorbent recycled polymers to be regenerated can be easily adjusted.

Hereinbelow, (1) the method of regenerating superabsorbent polymers which have been inactivated by an acid into superabsorbent recycled polymers which have a predetermined absorption property (hereinbelow, which may be referred to as "the regenerating method of the superabsorbent polymers", "the regenerating method of the present disclosure", etc.), (2) the method of manufacturing superabsorbent recycled polymers which have a predetermined absorption property from a used sanitary product which includes pulp fibers and superabsorbent polymers (hereinbelow, which may be referred to as "the manufacturing method of the superabsorbent recycled polymers", "the manufacturing method of the present disclosure", etc.), and (3) the use of an alkali metal ion supply source which is capable of supplying an alkali metal ion for regenerating superabsorbent polymers which have been inactivated by an acid into superabsorbent recycled polymers which have a predetermined absorption property (hereinbelow, which may be referred to as "the use of the alkali metal ion supply source", "the use of the present disclosure", etc.) according to the present disclosure are explained in detail.

Incidentally, from the viewpoint of ease of explanation, first, (2) the manufacturing method of the superabsorbent recycled polymers is explained, and as for (1) the regenerating method of the superabsorbent polymers and (3) the use of the alkali metal ion supply source, aspects which are different from those of (2) the manufacturing method of the superabsorbent recycled polymers are explained.

<<The Manufacturing Method of the Superabsorbent Recycled Polymers>>

The manufacturing method of the superabsorbent recycled polymers includes the following steps.

an inactivation step of forming superabsorbent polymers which have been inactivated by an acid by immersing, in an acid containing aqueous solution which includes an acid, a sanitary product configurational material which configures the sanitary product which includes the pulp fibers and the superabsorbent polymers having an acid group (hereinbelow, which may be referred to as "the inactivation step"), a superabsorbent recycled polymer formation step of forming wet-state superabsorbent recycled polymers, by adding an alkali metal ion supply source which is capable of supplying an alkali metal ion to an aqueous solution for regeneration which includes the superabsorbent polymers which have been inactivated by the acid (hereinbelow, which may be referred to as "the superabsorbent recycled polymer formation step"), and a drying step of forming the superabsorbent recycled polymers which have the predetermined absorption property by drying the wet-state superabsorbent recycled polymers (hereinbelow, which may be referred to as "the drying step").

<The Inactivation Step>

In the inactivation step, a sanitary product configurational material which includes the pulp fibers and the superabsorbent polymers having an acid group is immersed in an acid containing aqueous solution which includes an acid, whereby superabsorbent polymers which have been inactivated by an acid (hereinbelow, the superabsorbent polymers which have been inactivated by an acid may be referred to as "the acid inactivated superabsorbent polymers") are formed.

As the above-mentioned acid, although not particularly limited, for example, an inorganic acid and an organic acid may be mentioned. When superabsorbent polymers are inactivated by using an acid, in comparison with a case in which superabsorbent polymers are inactivated by using lime, calcium chloride, magnesium sulfate, magnesium chloride, aluminum sulfate, aluminum chloride, etc., it is difficult for ash to remain in the pulp fibers.

As the above-mentioned inorganic acid, for example, sulfuric acid, hydrochloric acid, and nitric acid may be mentioned, and the above-mentioned inorganic acid is preferably sulfuric acid from the viewpoint of not including chlorine, and of cost, etc. As the above-mentioned organic acid, those which include an acid group, for example, a carboxyl group, a sulfo group, etc., may be mentioned. Incidentally, an organic acid which includes a sulfo group is referred to as a sulfonic acid, and an organic acid which includes a carboxyl group and does not include a sulfo group is referred to as a carboxylic acid. The above-mentioned organic acid is preferably an organic acid which includes a carboxyl group, especially, a carboxylic acid, from the viewpoint of protecting the equipment.

In a case in which the above-mentioned organic acid includes a carboxyl group, the above-mentioned organic acid may include one or a plurality of carboxyl groups per one molecule, and preferably includes a plurality of carboxyl groups per one molecule. Accordingly, it is easier for the organic acid to form chelate complexes with divalent or higher valent metals included in excrement, etc., such as calcium, whereby it is easier to lower the ash of recycled pulp fibers to be manufactured from used sanitary products.

As the above-mentioned organic acid, for example, citric acid, tartaric acid, malic acid, succinic acid, oxalic acid (the aforementioned being carboxylic acids with a plurality of carboxyl groups), gluconic acid (C6), pentanoic acid (C5), butanoic acid (C4), propionic acid (C3), glycolic acid (C2), acetic acid (C2), for example, glacial acetic acid, formic acid (C1) (the aforementioned being carboxylic acids with one carboxyl group), methanesulfonic acid, trifluoromethanesulfonic acid, benzenesulfonic acid, p-toluenesulfone acid (the aforementioned being sulfonic acids), etc., may be mentioned.

The above-mentioned acid containing aqueous solution preferably has a predetermined pH, and the predetermined pH is preferably 4.5 or lower, more preferably 4.0 or lower, still more preferably 3.5 or lower, and still even more preferably 3.0 or lower. When the above-mentioned predetermined pH is too high, there may be cases in which the inactivation of the superabsorbent polymers is not sufficiently performed, and there is a tendency that the discharge of the excrement retained by the superabsorbent polymers is to be insufficient, and further, there is a tendency that it is more difficult for the superabsorbent polymers to be separated from the pulp fibers, etc.

Further, the above-mentioned predetermined pH is preferably 0.5 or higher, and more preferably 1.0 or higher. When the above-mentioned predetermined pH is too low, the superabsorbent polymers are inactivated in a greater degree, and in the superabsorbent recycled polymer formation step, there is a tendency that it takes time for the reaction of the inactivated superabsorbent polymers and the alkali metal ion supply source. Further, in a case in which the pulp fibers which are included in the used sanitary products are recycled so as to manufacture recycled pulp fibers in addition to the regeneration method of the present disclosure, there may be cases in which the recycled pulp fibers are damaged.

Incidentally, in the present description, pH means the value at 25° C. Further, the pH can be measured by using, for example, twin pH meter AS-711 manufactured by Horiba, Ltd.

In the manufacturing method of the present disclosure, it is preferable that the acid containing aqueous solution satisfies the above-mentioned predetermined pH at least at the time of the initiation of the inactivation step, for example, when immersing the sanitary product configurational material in the acid containing aqueous solution. This is for the purpose of inactivating the superabsorbent polymers, and when the inactivation of the superabsorbent polymers is not sufficiently performed, there may be cases in which the inactivation of the superabsorbent polymers is not sufficiently performed, whereby there is a tendency that the discharge of the liquid such as bodily fluid, etc., retained by the superabsorbent polymers is to be insufficient, and further, there is a tendency that it is more difficult for the superabsorbent polymers to be separated from the pulp fibers, etc.

In the manufacturing method of the present disclosure, it is preferable that the above-mentioned pH is satisfied at the time of termination of the inactivation step. This is from the viewpoint of the continuing the inactivation of the superabsorbent polymers.

The above-mentioned superabsorbent polymers are not particularly limited as long as they are used as superabsorbent polymers which include an acid group, in the technical field, and for example, those which include a carboxyl group, a sulfo group, etc., may be mentioned, and are preferably those which include a carboxyl group.

As the superabsorbent polymers which include a carboxyl group, for example, those of polyacrylic acid based and polymaleic anhydride based may be mentioned, and as the superabsorbent polymers which include a sulfo group, those of polysulfonic acid based may be mentioned.

The above-mentioned pulp fibers are not particularly limited as long as they may be included in sanitary products.

Incidentally, it is preferable that the acid for inactivating the superabsorbent polymers have an acid dissociation constant ($pk_a$, underwater) which is smaller than the acid dissociation constant ($pk_a$, underwater) of the acid group included in the superabsorbent polymers, so that the superabsorbent polymers are efficiently inactivated.

In a case in which the above-mentioned acid has a plurality of acid groups, for example, in a case in which the above-mentioned acid is a dibasic acid or a tribasic acid, it is preferable that the largest acid dissociation constant ($pk_a$, underwater) among the acid dissociation constants ($pk_a$, underwater) of the above-mentioned acid is smaller than the acid dissociation constant ($pk_a$, underwater) of the acid group included in the superabsorbent polymers, and in a case in which the superabsorbent polymers include a plurality of types of acid groups, it is preferable that the largest acid dissociation constant ($pk_a$, underwater) among the acid dissociation constants ($pk_a$, underwater) of the above-mentioned acid is smaller than the smallest acid dissociation constant ($pk_a$, underwater) among the plurality of types of the acid groups of the superabsorbent polymers. This is from the viewpoint of the inactivation efficiency of the superabsorbent polymers.

In the present description, as the acid dissociation constant ($pk_a$, underwater), the value described in Electrochemistry Handbook edited by The Institute of Electrochemistry can be adopted.

According to the Electrochemistry Handbook, the acid dissociation constant ($pk_a$, underwater, 25° C.) of the major compounds are as follows.

[Organic Acid]
tartaric acid: 2.99 ($pK_{a1}$), 4.44 ($pK_{a2}$)
malic acid: 3.24 ($pK_{a1}$), 4.71 ($pK_{a2}$)
citric acid: 2.87 ($pK_{a1}$), 4.35 ($pK_{a2}$), 5.69 ($pK_{a3}$)
[Inorganic Acid]
sulfuric acid: 1.99

The acid dissociation constant ($pk_a$, underwater) of the acids which is not described in the Electrochemistry Handbook can be obtained by measurement. As the device which is capable of measuring the acid dissociation constant ($pk_a$, underwater) of acids, for example, Compound physical property analysis system, T3, manufactured by Sirius Co., Ltd, may be mentioned.

In the manufacturing method of the present disclosure, the concrete procedure is not particularly limited as long as the sanitary product configurational material can be immersed in an acid containing aqueous solution, and for example, the sanitary product configurational material may be thrown into a tank which includes the acid containing aqueous solution, or the acid containing aqueous solution may be thrown into a tank in which the sanitary product configurational material is disposed.

The above-mentioned sanitary products are not particularly limited as long as they include superabsorbent polymers, and for example, as such sanitary products, a disposable diaper, a disposable shorts, a sanitary napkin, a panty liner, a urine collection pad, a bed sheet, a pet sheet, etc., may be mentioned. The above-mentioned sanitary products preferably include pulp fibers and superabsorbent polymers.

As the above-mentioned sanitary products, for example, those which include a liquid permeable sheet, a liquid impermeable sheet, and an absorbent body (an absorbent core and a core wrap) placed therebetween may be exemplified.

In the manufacturing method of the present disclosure, the sanitary product configurational material in the inactivation step may be mixed matter of pulp fibers and superabsorbent polymers, for example, an absorbent core which is extracted from used sanitary products. Further, the sanitary product configurational material may be sanitary products themselves.

In a case in which the sanitary product configurational material which is to be immersed in the acid containing aqueous solution includes, in addition to the pulp fibers and superabsorbent polymers (hereinbelow, which may be referred to as "a specified material"), additional materials (hereinbelow, which may be referred to as "a non-specified material"), for example, a liquid permeable sheet, a liquid impermeable sheet, etc., for example, in a case in which the sanitary products themselves are immersed in the acid containing aqueous solution as the sanitary product configurational material, the method may further comprise a removal step of removing the non-specified material, after the inactivation step (hereinbelow, which may be referred to as "a removal step"). Incidentally, in the above-mentioned removal step, the entire non-specified material may be removed, or a portion of the non-specified material may be removed.

The specific example of the above-mentioned removal step is explained later in connection with the system 1 shown in FIG. 1 and the flowchart shown in FIG. 3.

In the inactivation step, for example, the sanitary product configurational material may be stirred for approximately 5 to 60 minutes, although depending on the temperature, in an inactivation tank which includes the acid containing aqueous solution, whereby the superabsorbent polymers can be inactivated, and the acid inactivated superabsorbent polymers can be formed.

In the inactivation step, the acid group of the superabsorbent polymers which have the acid group changes from the state of salt (for example, sodium salt) to the state of free acid, whereby the absorption property of the superabsorbent polymers is lowered.

The present inventors found out that when the superabsorbent polymers which have absorbed water are put into an acid containing aqueous solution, the negatively charged hydrophilic group (for example, —COO⁻) is neutralized by positively charged hydrogen ions (H⁺) (for example, —COOH), whereby the ionic repulsion of the hydrophilic group weakens, the absorption power is lowered, and the superabsorbent polymers are dehydrated.

The temperature of the acid containing aqueous solution in the inactivation step is not particularly limited, and for example, may be the room temperature (25° C.), or may be higher than the room temperature.

To be specific, the temperature of the acid containing aqueous solution in the inactivation step is preferably higher than the room temperature, more preferably 60 to 100° C., still more preferably 70 to 95° C., and even more preferably 80 to 90° C. Accordingly, by the acid which is included in the acid containing aqueous solution, it is easier to sterilize the fungi which derive from excrement, etc., included in the acid containing aqueous solution.

<The Superabsorbent Recycled Polymer Formation Step>

In the superabsorbent recycled polymer formation step, an alkali metal ion supply source which is capable of supplying an alkali metal ion is added to an aqueous solution for regeneration which includes the acid inactivated superabsorbent polymers, whereby the wet-state superabsorbent recycled polymers are formed.

Incidentally, in the present description, the superabsorbent polymers which are obtained by recycling inactivated superabsorbent polymers are referred to as "the superabsorbent recycled polymers".

The present inventors found out that by making the alkali metal ion supply source come into contact with the acid inactivated superabsorbent polymers while adjusting the amount of the alkali metal ion supply source in water, etc. so that a portion of the acid group of the superabsorbent polymers is to be an alkali metal salt, whereby the absorption property of the wet-state superabsorbent recycled polymers (that is, the absorption property of the dry-state superabsorbent recycled polymers) can be controlled.

The above-mentioned alkali metal ion supply source is not particularly limited as long as it can supply an alkali metal ion, and for example, a hydroxide of an alkali metal or a salt of a hydroxide of an alkali metal and an acid (hereinbelow, which may simply be referred to as "the salt"), etc., may be mentioned.

As the above-mentioned alkali metal ion, a lithium ion, a sodium ion, a potassium ion, and any combination of the aforementioned may be mentioned.

As the above-mentioned hydroxide of an alkali metal, lithium hydroxide, sodium hydroxide, potassium hydroxide, and any combination of the aforementioned may be mentioned.

The above-mentioned salt may be an acid salt, a basic salt, etc.

As the hydroxide of an alkali metal in the above-mentioned salt, lithium hydroxide, sodium hydroxide, potassium hydroxide, and any combination of the aforementioned may be mentioned.

The acid in the above-mentioned salt is not particularly limited, and for example, the acid mentioned in "the inactivation step" (for example, hydrochloric acid, sulfuric acid), carbonic acid, etc., may be mentioned.

It is preferable that the above-mentioned acid is an acid which has an acid dissociation constant ($pk_a$, underwater) which is larger than the acid dissociation constant ($pk_a$, underwater) of the acid group included in the superabsorbent polymers. Accordingly, it is easier for the acid group of the superabsorbent polymers to form an alkali metal salt.

In a case in which the above-mentioned acid has a plurality of acid groups, for example, in a case in which the above-mentioned acid is a dibasic acid or a tribasic acid, it is preferable that the smallest acid dissociation constant ($pk_a$, underwater) among the acid dissociation constants ($pk_a$, underwater) of the above-mentioned acid is larger than the acid dissociation constant ($pk_a$, underwater) of the acid group included in the superabsorbent polymers, and in a case in which the superabsorbent polymers include a plurality of types of acid groups, it is preferable that the smallest acid dissociation constant ($pk_a$, underwater) among the acid dissociation constants ($pk_a$, underwater) of the above-mentioned acid is larger than the largest acid dissociation constant ($pk_a$, underwater) among the plurality of types of the acid groups of the superabsorbent polymers. This is from the viewpoint of making it easier for the acid group of the superabsorbent polymers to be an alkali metal salt.

The carbonic acid as the above-mentioned acid is preferable, since it is difficult for carbonic acid to remain in an inactivation aqueous solution, or it is easy for carbonic acid to be removed by being heated, etc.

Further, the above-mentioned acids other than carbonic acid, although depending on the pH of the wet-state superabsorbent recycled polymers, for example, in a case in which the wet-state superabsorbent recycled polymers have an acidic pH, can give an antibacterial property to the wet-state superabsorbent recycled polymers and the thy-state superabsorbent recycled polymers, etc.

As the above-mentioned salt, lithium carbonate, sodium carbonate, potassium carbonate, lithium hydrogen carbonate, sodium hydrogen carbonate, potassium hydrogen carbonate, lithium chloride, sodium chloride, potassium chloride, etc., may be mentioned.

In the superabsorbent recycled polymer formation step, the aqueous solution for regeneration may be acidic (pH<7.0), neutral (pH=7.0) or alkaline (7.0<pH), and the aqueous solution for regeneration is preferably neutral or alkaline, and is preferably alkaline. This is from the viewpoint of the effect of the present disclosure.

In order to make the aqueous solution for regeneration acidic, neutral or alkaline, the aqueous solution for regeneration may include an acidic substance, an alkaline substance, or a buffer substance (a buffer solution), and the above-mentioned alkali metal ion supply source may include an acidic substance, an alkaline substance, or a buffer substance (a buffer solution).

The above-mentioned acidic substance, an alkaline substance, or a buffer substance (a buffer solution) is preferable in a case in which it is difficult for the alkali metal ion supply source to change the pH of the aqueous solution for regeneration (for example, in a case in which the alkali metal ion supply source is lithium chloride, sodium chloride, potassium chloride, etc.).

The above-mentioned acidic substance is not particularly limited as long as it can make the pH of a deionized water be alkaline (7.0<pH), those known in the technical field can be adopted, and for example, the acid, carbonic acid, etc., which are mentioned in "the inactivation step" may be mentioned.

The above-mentioned alkaline substance is not particularly limited as long as it can make the pH of a deionized water be alkaline (7.0<pH), those known in the technical field can be adopted, and for example, a hydroxide of an alkali metal or the salt thereof, a hydroxide of an alkaline earth metal hydroxide or the salt thereof, etc., may be mentioned, and from the viewpoint of making it difficult for the superabsorbent polymers to be inactivated, a hydroxide of an alkali metal or the salt thereof is preferable. The hydroxide of an alkali metal or the salt thereof is as mentioned above.

As the above-mentioned buffer substance (a buffer solution), for example, a carbonic acid-bicarbonate buffer solution which includes sodium carbonate, sodium hydrogen carbonate, and water, may be mentioned.

The above-mentioned aqueous solution for regeneration is not particularly limited as long as it includes water, and may be an aqueous solution which is substantially neutral (for example, tap water, deionized water, etc.), an acidic aqueous solution (an aqueous solution which satisfies pH<7.0), for example, the acid containing aqueous solution which is used in the inactivation step, the aqueous solution which includes inorganic acid or organic acid which is described in the section of the inactivation step, or an alkaline aqueous solution (an aqueous solution which satisfies 7.0<pH), for example, an aqueous solution which includes the above-mentioned alkali metal ion supply source.

The present inventors also found out that by adjusting the pH of the system which includes the acid inactivated superabsorbent polymers, that is, the pH of the aqueous solution for regeneration, the absorption property of the wet-state superabsorbent recycled polymers (that is, the absorption property of the dry-state superabsorbent recycled polymers) can be adjusted within a predetermined range.

Incidentally, "the wet-state superabsorbent recycled polymers" which are formed in the superabsorbent recycled polymer formation step have a similar absorption property as "the superabsorbent recycled polymers" which are obtained in the drying step, however, depending on the concrete method of the drying step, there may be cases in which the absorption property of the superabsorbent recycled polymers changes, for example, the reaction of the acid group of the superabsorbent recycled polymers and the alkali metal further proceeds, and the absorption property of the superabsorbent recycled polymers is slightly increased, although what adjusts the absorption property of the dry-state superabsorbent recycled polymers is the superabsorbent recycled polymer formation step.

The above-mentioned pH is not particularly limited as long as the dry-state superabsorbent recycled polymers can achieve the predetermined absorption property (the absorption magnification), and may be within any one of the acidic pH region (pH<7.0), neutral pH (pH=7.0), and the alkaline pH region (7.0<pH), and the above-mentioned pH is preferably 5.0 to 9.0.

In a case in which the above-mentioned pH is adjusted within the acidic pH region, the above-mentioned aqueous solution for regeneration is preferably an acidic aqueous solution, and it is preferable that an alkali metal ion supply source is added as it is or as an aqueous solution to an aqueous solution for regeneration which is an acidic aqueous solution, whereby the wet-state superabsorbent recycled polymers are formed.

In a case in which the above-mentioned pH is adjusted within the neutral pH or alkaline pH region, the above-mentioned aqueous solution for regeneration may be an acidic aqueous solution, a substantially neutral aqueous solution, or an alkaline aqueous solution, and is preferably a substantially neutral aqueous solution, or an alkaline aqueous solution. This is from the viewpoint of using the alkali metal ion supply source efficiently for the formation of the superabsorbent recycled polymers.

Further, it is preferable that an alkali metal ion supply source is added as it is or as an aqueous solution to an aqueous solution for regeneration which is a substantially neutral aqueous solution or an alkaline aqueous solution, whereby the wet-state superabsorbent recycled polymers are formed.

The alkali metal ion supply source, as mentioned above, may be present in the aqueous solution for regeneration, and the alkali metal ion supply source may be added to the aqueous solution for regeneration as it is or as an aqueous solution.

In a case in which a hydroxide of an alkali metal is added to an aqueous solution for regeneration as the alkali metal ion supply source, it is preferable that the hydroxide of an alkali metal is an aqueous solution, and the aqueous solution is added to the aqueous solution for regeneration with a concentration so that the hydroxide ion concentration is to be preferably 0.1 to 5.0 mol/L, more preferably 0.3 to 3.0 mol/L, and even more preferably 0.4 to 1.0 mol/L. This is from the viewpoint of ease of adjusting the pH of the aqueous solution for regeneration, and the absorption property of the superabsorbent recycled polymers.

Incidentally, the acid inactivated superabsorbent polymers may be separated from the acid containing aqueous solution by using a device which is capable of solid-liquid separation, and subsequently, the acid inactivated superabsorbent polymers which have been separated from the acid containing aqueous solution may be immersed in the aqueous solution for regeneration. As the device which is capable of solid-liquid separation, for example, a rotary drum screen, a tilted screen, a vibration screen, etc., may be mentioned.

The superabsorbent recycled polymer formation step can be performed by stirring, etc., the aqueous solution for regeneration at a predetermined temperature, for example, 2 to 80° C., for a predetermined amount of time, for example, 5 to 60 minutes.

<The Drying Step>

In the drying step, the wet-state superabsorbent recycled polymers are dried, whereby the superabsorbent recycled polymers which have a predetermined absorption property are formed.

The above-mentioned predetermined absorption property is not particularly limited, however, considering the practicality of the superabsorbent recycled polymers, the predetermined absorption property has any value of preferably 100 times (g/g) or more, more preferably 200 times (g/g) or more, and even more preferably 300 times (g/g) or more with respect to a deionized water as the absorption magnification.

The above-mentioned predetermined absorption property is not particularly limited, however, considering the gel strength at the time when superabsorbent recycled polymers are swollen, the predetermined absorption property has any value of preferably 500 times (g/g) or less, more preferably 450 times (g/g) or less, and even more preferably 400 times (g/g) or less with respect to a deionized water as the absorption magnification.

In the drying step, the aqueous solution for regeneration which includes the wet-state superabsorbent recycled polymers obtained in the superabsorbent recycled polymer formation step is directly dried, whereby the dry-state superabsorbent recycled polymers can be obtained.

Further, by using a device which is capable of solid-liquid separation, superabsorbent recycled polymers may also be separated from the aqueous solution for regeneration which includes the superabsorbent recycled polymers. As the device which is capable of solid-liquid separation, for example, a rotary drum screen, a tilted screen, a vibration screen, etc., may be mentioned.

The separated superabsorbent recycled polymers may be, before being dried, washed by using tap water, deionized water, etc., so as to remove the aqueous solution for regeneration which is attached to the surface of the superabsorbent recycled polymers.

Further, the separated superabsorbent recycled polymers may be, before being dried, made to come into contact with a hydrophilic organic solvent (for example, may be made to be immersed in a hydrophilic organic solvent), whereby the moisture which is included in the separated superabsorbent recycled polymers may be dehydrated to as much as the absorption magnification of preferably 100 times (g/g) or less, more preferably 70 times (g/g) or less, and even more preferably 50 times (g/g) or less. Accordingly, the temperature of the drying can be lowered, and/or the time of the drying can be reduced.

The above-mentioned hydrophilic organic solvent is preferably those that are miscible with water, and for example, an alcohol-based solvent (for example, methanol, ethanol, propyl alcohol and the isomers thereof, butyl alcohol and the isomer thereof), a ketone-based solvent (for example, acetone, methyl ethyl ketone), a nitrile-based solvent (for example, acetonitrile), etc., may be mentioned.

In the drying step, the wet-state superabsorbent recycled polymers are dried at the drying temperature of preferably room temperature (for example, 25° C.) to 120° C., more preferably 30 to 80° C., and even more preferably 40 to 60° C. When the drying temperature is lower, the drying time tends to be longer, and when the drying temperature is higher, there may be cases in which the absorption property of the superabsorbent recycled polymers is lowered due to the occurrence of the dehydration condensation of the acid groups of the superabsorbent recycled polymers, etc.

In a case in which the separated superabsorbent recycled polymers are, before being dried, made to conic into contact with a hydrophilic organic solvent, the above-mentioned drying temperature may be set lower, for example, room temperature to 60° C.

The drying step may be performed under reduced pressure, for example, 0.1 kPa or more and less than 100 kPa.

The drying step may be performed, for example, for 30 to 300 minutes.

The drying step is preferably performed so that the weight loss on drying of the superabsorbent recycled polymers is preferably 15% or less (2.0 g, 105° C., 3 hours). This is from the viewpoint of using the superabsorbent recycled polymers.

The above-mentioned weight loss on drying is measured in accordance with "7. Weight loss test method" of <2. General test method> of "Standards for materials of sanitary treatment products" which is attached as a separate sheet to "Regarding the standards for materials of sanitary treatment products" notified as the Pharmaceutical and food examination issue 0325 No. 24 on Mar. 25, 2015 by The Ministry of health, labor and welfare.

After the drying step, in a case in which the dried superabsorbent recycled polymers are fixed, or integrated, etc., the crushing, classification, etc., of the dried superabsorbent recycled polymers may be performed.

<<The Regenerating Method of the Superabsorbent Polymers which have been Inactivated by an Acid>>

The regenerating method of the superabsorbent polymers includes the following steps.

a preparation step of preparing the superabsorbent polymers having an acid group and having been inactivated by the acid (hereinbelow, which may be referred to as "the preparation step"), a superabsorbent recycled polymer formation step of forming wet-state superabsorbent recycled polymers, by adding an alkali metal ion supply source which is capable of supplying an alkali metal ion to an aqueous solution for regeneration which includes the superabsorbent polymers which have been inactivated by the acid (hereinbelow, which may be referred to as "the superabsorbent recycled polymer formation step"), and a drying step of forming the superabsorbent recycled polymers which have the predetermined absorption property by drying the wet-state superabsorbent recycled polymers (hereinbelow, which may be referred to as "the drying step").

<The Preparation Step>

In the preparation step, the acid inactivated superabsorbent polymers which have acid groups are prepared.

The above-mentioned acid inactivated superabsorbent polymers are not particularly limited as long as they are inactivated by an acid, and for example, they may be prepared as explained at the section of "the inactivation step" in "the manufacturing method of the superabsorbent recycled polymers" in the present description.

Further, the acid inactivated superabsorbent polymers includes, other than those described above, those in which superabsorbent polymers included in a used sanitary product are inactivated by using a polyvalent metal salt, for example, an alkaline earth metal salt, followed by being treated by an acid.

<The Superabsorbent Recycled Polymer Formation Step and the Drying Step>

Since "the superabsorbent recycled polymer formation step" and "the drying step" in the regenerating method of the present disclosure are the same as "the superabsorbent recycled polymer formation step" and "the drying step" in "the manufacturing method of the superabsorbent recycled polymers", respectively, the explanations thereof are omitted.

<The Use of the Alkali Metal Ion Supply Source>

The use of the alkali metal ion supply source includes the following steps.

a superabsorbent recycled polymer formation step of forming wet-state superabsorbent recycled polymers, by adding the alkali metal ion supply source which is capable of supplying an alkali metal ion to an aqueous solution for regeneration which includes the superabsorbent polymers having an acid group and having been inactivated by the acid (hereinbelow, which may be referred to as "the superabsorbent recycled polymer formation step").

Since "the superabsorbent recycled polymer formation step" in the use of the present disclosure is the same as "the superabsorbent recycled polymer formation step" in "the manufacturing method of the superabsorbent recycled polymers", the explanation thereof is omitted.

FIG. 1 is a block diagram of the system 1 so as to perform the manufacturing method, the regenerating method, and the use according to one embodiment of the present disclosure. FIG. 1 is a diagram for explaining the manufacturing method, the regenerating method, and the use according to one embodiment of the present disclosure, and does not limit the present disclosure in any way.

The system 1 includes the rupturing device 11, the crushing device 12, the first separation device 13, the first dust removal device 14, the second dust removal device 15, the third dust removal device 16, the second separation device 17, the third separation device 18, the oxidizing agent treatment device 19, and the fourth separation device 20.

Figure 2:
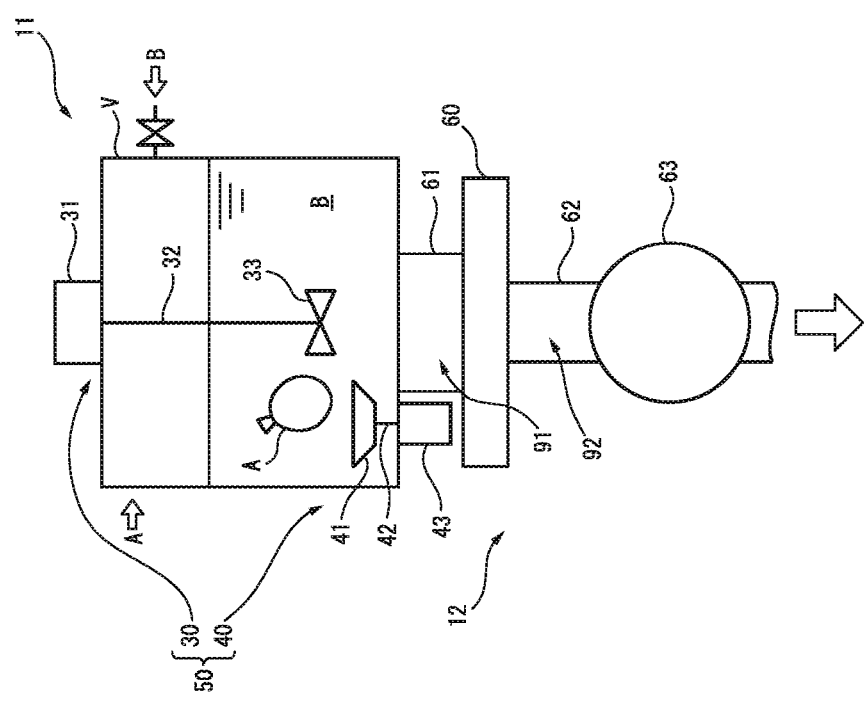
FIG. 2 is a schematic view which shows the configurational example of the rupturing device 11 and the crushing device 12 of FIG. 1.

The rupturing device 11 is filled with the acid containing aqueous solution, and within the acid containing aqueous solution, a hole portion is formed in the collection bag which includes used sanitary products. The crushing device 12 crushes the used sanitary products that have sunk below the surface of the acid containing aqueous solution together with the collection bag. FIG. 2 is a schematic diagram which shows a configuration example of the rupturing device 11 and the crushing device 12 of FIG. 1.

The rupturing device 11 is filled with an acid containing aqueous solution B, and a hole portion is formed in the collection bag A that has sunk in the acid containing aqueous solution B, so as to form the collection bag with a hole portion including used sanitary products 91. The rupturing device 11 includes the solution tank V and the hole formation portion 50. The solution tank V stores the acid containing aqueous solution B. The hole formation portion 50 is provided in c solution tank V, and when the collection bag A is put into the solution tank V, the hole formation portion 50 forms the hole portion on the surface of the collection bag A in contact with the acid containing aqueous solution B.

The hole formation portion 50 includes a feeding portion 30 and a rupturing portion 40. The feeding portion 30 feeds (draws) (physically forcibly) the collection bag A into the acid containing aqueous solution B in the solution tank V. As the feeding portion 30, for example, a stirring machine may be mentioned, and includes the stirring blade 33, the supporting shaft (the rotation shaft) 32 which supports the stirring blade 33, and the driving device 31 which rotates along the shaft of the supporting shaft 32. The stirring blade 33 rotates around the rotation shaft (supporting shaft) 32 by the driving device 31, whereby causes a swirling flow in the acid containing aqueous solution B. The feeding portion 30 draws the collection bag A toward the bottom portion direction of the acid containing aqueous solution B (solution tank V) by the swirling flow.

The rupturing portion 40 is disposed at the lower portion (preferably at the bottom portion) of the solution tank V, and includes the rupturing blade 41, the supporting shaft (the rotation shaft) 42 which supports the rupturing bag blade 41, and the driving device 43 which rotates along the shaft of the supporting shaft 42. The rupturing blade 41 rotates around the rotation shaft (supporting shaft) 42 by the driving device 43, whereby forms the hole portion in the collection bag A that has moved to the lower portion of the acid containing aqueous solution B (solution tank V).

The crushing device 12 crushes the used sanitary products in the collection bag A which have sunk under the water surface of the acid containing aqueous solution B together with the collection bag A. The crushing device 12 includes the crushing portion 60 and the pump 63. The crushing portion 60 is connected to the solution tank V through the pipe 61, and crushes the collection bag with a hole portion including used sanitary products 91 discharged from the solution tank V, together with the collection bag A, in the acid containing aqueous solution B, so as to form the acid containing aqueous solution including crushed matter 92.

As examples of the crushing portion 60, a biaxial crusher (for example, a biaxial rotary crusher, a biaxial differential crusher, and a biaxial shear crusher), may be mentioned, and for example, the Sumicutter (manufactured by Sumitomo Heavy Industries Environment Co., Ltd.), may be mentioned. The pump 63 is connected to the crushing portion 60 through the pipe 62, and draws the acid containing aqueous solution including crushed matter 92 obtained by the crushing portion 60 from the crushing portion 60, and delivers the same to the next process. Note that, the crushed matter includes materials including pulp fibers, the acid inactivated superabsorbent polymers, materials of the collection bag A, films, nonwoven fabrics, elastic bodies, etc.

The first separation device 13 stirs the acid containing aqueous solution including crushed matter 92 obtained by the crushing device 12, and while performing the washing so as to remove dirt (excrement, etc.) from the crushed matter, separates the acid containing first aqueous solution in which foreign matter is removed 93 from the acid containing aqueous solution including crushed matter 92, and delivers the acid containing first aqueous solution 93 to the first dust removal device 14. Incidentally, the acid containing first aqueous solution 93 includes the pulp fibers and the acid inactivated superabsorbent polymers.

As the first separation device 13, for example, a washing machine including a washing and dehydrating tank and a water tank surrounding the washing and dehydrating tank, may be mentioned. Note that, the washing and dehydrating tank (a rotating drum) is used as a washing and sieving tank (separating tank). As the above-mentioned washing machine, for example, a horizontal-type washing machine ECO-22B (manufactured by Inamoto Co., Ltd.) may be mentioned.

The first dust removal device 14 further removes foreign matter present in the acid containing first aqueous solution 93 by a screen having a plurality of openings, so as to form the acid containing second aqueous solution 94 in which foreign matter is further removed compared to the acid containing first aqueous solution 93. Incidentally, the acid containing second aqueous solution 94 includes the pulp fibers and the acid inactivated superabsorbent polymers. As the first dust removal device 14, for example, a screen separator (a coarse screen separator), and more specifically, for example, the Pack pulper (manufactured by Satomi Corporation), may be mentioned.

The second dust removal device 15 removes finer foreign matter from the acid containing second aqueous solution 94, which is delivered from the first dust removal device 14 by a screen having a plurality of openings, so as to form the acid containing third aqueous solution 95 in which foreign matter is still further removed compared to the acid containing second aqueous solution 94. Incidentally, the acid containing third aqueous solution 95 includes the pulp fibers and the acid inactivated superabsorbent polymers. As the second dust removal device 15, for example, a screen separator, specifically, for example, Ramoscreen (manufactured by Aikawa Iron Works Co., Ltd.), may be mentioned.

The third dust removal device 16 removes still finer foreign matter from the acid containing third aqueous solution 95, which is delivered from the second dust removal device 15 by centrifugation, so as to form the acid containing fourth aqueous solution 96 in which foreign matter is still even further removed compared to the acid containing third aqueous solution 95. Incidentally, the acid containing third aqueous solution 95 includes the pulp fibers and the acid inactivated superabsorbent polymers. As the third dust removal device 16, for example, a cyclone separator, specifically, the ACT low concentration cleaner (manufactured by Aikawa Iron Works Co., Ltd.), may be mentioned.

The second separation device 17 separates the acid containing fourth aqueous solution 96 which is delivered from the third dust removal device 16 by a screen having a plurality of openings, into the acid containing aqueous solution which includes the acid inactivated superabsorbent polymers, and the acid containing aqueous solution 97 which mainly includes the pulp fibers. Incidentally, in the acid containing aqueous solution 97 which mainly includes the pulp fibers, the acid inactivated superabsorbent polymers also remain.

As the second separation device 17, for example, a drum screen separator, and more specifically, a drum screen dehydrator manufactured by Toyo Screen Co., Ltd., may be mentioned.

The third separation device 18, while separating the acid containing aqueous solution 97 which mainly includes the pulp fibers delivered from the second separation device 17, by a screen having a plurality of openings, into the solid 98 which includes the pulp fibers and the acid inactivated superabsorbent polymers, and a liquid which includes the acid inactivated superabsorbent polymers and the acid containing aqueous solution, applies pressure to the solid 98 which includes the pulp fibers and the acid inactivated superabsorbent polymers so as to squash the acid inactivated superabsorbent polymers in the solid 98 which includes the pulp fibers and the acid inactivated superabsorbent polymers.

As the third separation device 18, for example, a screw press dehydrator, and more specifically, a screw press dehydrator manufactured by Kawaguchi Seiki Co., Ltd., may be mentioned.

The oxidizing agent treatment device 19 treats the solid 98 which includes the pulp fibers and the acid inactivated superabsorbent polymers delivered from the third separation device 18 with an aqueous solution (the treatment solution) which includes an oxidizing agent. Accordingly, the oxidizing agent treatment device 19 performs oxidative decomposition for the acid inactivated superabsorbent polymers so as to be removed from the pulp fibers, and delivers the treatment solution 99 which includes the recycled pulp fibers.

The oxidizing agent treatment device, in a case in which ozone is used as the oxidizing agent, for example, includes a treatment tank and an ozone supplying device. The treatment tank stores the acidic aqueous solution as the treatment solution. The ozone supplying device supplies ozone containing gas which is a gaseous substance to the treatment tank. As the ozone generating device of the ozone supplying device, for example, ozone water exposure tester ED-OWX-2 manufactured by EcoDesign, Inc., and ozone generator OS-25V manufactured by Mitsubishi Electric Corporation, may be mentioned.

Incidentally, the oxidizing agent treatment device can decompose the acid inactivated superabsorbent polymers by using other oxidizing agents, for example, chlorine dioxide, peracid (for example, peracetic acid), sodium hypochlorite, and hydrogen peroxide.

The fourth separation device 20 separates the treatment solution 99 which includes the recycled pulp fibers, having been treated by the oxidizing agent treatment device 19, by using a screen having a plurality of openings, into the recycled pulp fibers and the treatment solution. As the fourth separation device 20, for example, a screen separator may be mentioned.

Figure 3:
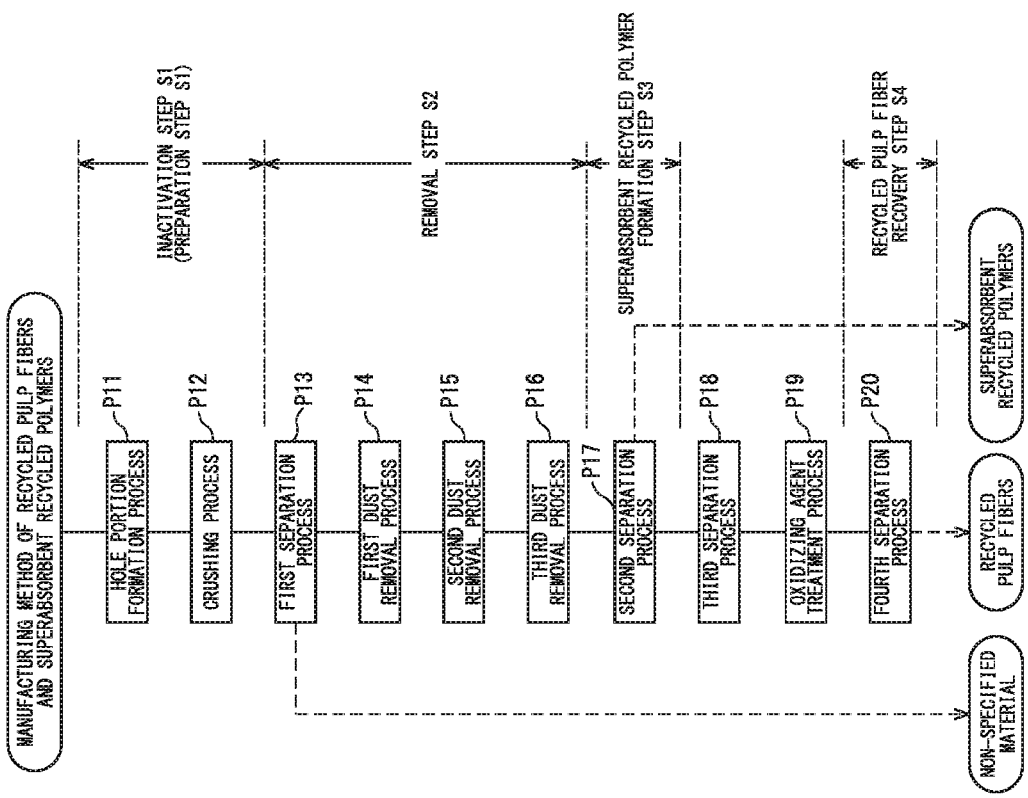
FIG. 3 is a flowchart which explains the method of manufacturing recycled pulp fibers and superabsorbent recycled polymers from a used sanitary product by using the system 1.

FIG. 3 is a flowchart which explains the method of manufacturing recycled pulp fibers and superabsorbent recycled polymers from used sanitary products using the system 1 shown in FIG. 1. The flowchart shown in FIG. 3 is an example, and does not limit the present disclosure in any way.

FIG. 3 shows the inactivation step S1 (the preparation step S1), the removal step S2, the superabsorbent recycled polymer formation step S3, and the recycled pulp fiber recovery step S4. The inactivation step S1 (the preparation step S1) includes the hole portion formation process P11 and the crushing process P12; the removal step S2 includes the first separation process P13, the first dust removal process P14, the second dust removal process P15, and the third dust removal process P16; the superabsorbent recycled polymer formation step S3 includes the second separation process P17; and the recycled pulp fiber recovery step S4 includes the fourth separation process P20. Hereinbelow, the detailed descriptions are given.

The hole portion formation process P11 is performed by the rupturing device 11. The collection bags A in which the used sanitary products are enclosed are thrown into the solution tank V in which the acid containing aqueous solution B is stored, and the hole portion is formed in the surface of the collection bag A which comes into contact with the acid containing aqueous solution B. When the hole portion is formed in the collection bag A, the acid containing aqueous solution B surrounds and seals the collection bag A so that the dirt, fungi and odor, etc., of the used sanitary products inside the collection bag A are not released outside. When the acid containing aqueous solution enters inside the collection bag A from the above-mentioned hole portion, the gas inside the collection bag A exits to the outside of the collection bag A, the specific gravity of the collection bag A is to be larger than that of the acid containing aqueous solution B, and the collection bag A sinks inside the acid containing aqueous solution B. Further, the acid in the acid containing aqueous solution B acts as an inactivating agent so as to inactivate the superabsorbent polymers inside the used sanitary products inside the collection bag A.

The superabsorbent polymers inside the used sanitary products are inactivated and the absorption performance thereof is reduced, whereby the superabsorbent polymers are dehydrated and the particle diameter is decreased, and thus the handling at each of the subsequent processes becomes easier and the treatment efficiency is improved. When an acid is used for the inactivation, in comparison with a case in which the superabsorbent polymers are inactivated by using lime or calcium chloride, etc., there is an advantage that ash does not remain in the pulp fibers, and further, that it is easier to adjust the degree of inactivation (the particle diameter and the degree of specific gravity, etc.) by pH.

In a case in which the sanitary product configurational material to be immersed in the acid containing aqueous solution includes a non-specified material, such as a liquid permeable sheet, a liquid impermeable sheet, etc., for example, in a case in which the sanitary products themselves are immersed in the acid containing aqueous solution as the sanitary product configurational material, it is preferable that the size, the specific gravity, etc., of the pulp fibers which configure the specified material are relatively close to the size, the specific gravity, etc., of the superabsorbent polymers. Also from such a viewpoint, in the inactivation step, it is preferable that the acid containing aqueous solution has the above-mentioned predetermined pH.

In the rupturing device 11 of FIG. 2, by the rotation of the stirring blade 33 around the rotation shaft (supporting shaft) 32, a swirling flow is caused in the acid containing aqueous solution B, whereby the collection bag A is physically and forcibly drawn toward the bottom portion direction of the acid containing aqueous solution B (the solution tank V). Further, the collection bag A which has moved to the bottom portion comes into contact with the rupturing blade 41, by the rotation of the rupturing blade 41 around the rotation shaft (supporting shaft) 42, whereby the hole portion is formed in the collection bag A.

The crushing process S12 is performed by the crushing device 12. The collection bag with a hole portion including used sanitary products 91 moves together with the acid containing aqueous solution B from the solution tank V to the crushing device 12, and inside the crushing device 12, the used sanitary products inside the collection bag A are crushed together with the collection bag A within the acid containing aqueous solution B.

For example, in the crushing device 12 of FIG. 2, first, by the crushing portion 60, the collection bag with a hole portion including used sanitary products 91 which has been delivered from the solution tank V together with the acid containing aqueous solution B is crushed together with the collection bag A within the acid containing aqueous solution B (the in-liquid crushing process). In the crushing device 12 of FIG. 2, by the pump 63, the acid containing aqueous solution including crushed matter 92 which has been obtained at the crushing portion 60 (the in-liquid crushing process) is drawn from the crushing portion 60 (the drawing process), and is delivered to the subsequent process.

The first separation process P13 is performed by the first separation device 13. While stirring the acid containing aqueous solution including crushed matter 92 which has been obtained at the crushing device 12, and while the washing to remove dirt from the crushed matter is performed, the acid containing aqueous solution including crushed matter 92 is separated into the specified material and the acid containing aqueous solution (that is, the acid containing aqueous solution which includes pulp fibers and the acid inactivated superabsorbent polymers), and the non-specified material of the sanitary products. At this time, in order to improve the cleaning effect, and/or to adjust pH, the acid containing aqueous solution may be added separately.

As a result, the acid containing first aqueous solution 93 which includes the pulp fibers and the acid inactivated superabsorbent polymers is separated from the acid containing aqueous solution including crushed matter 92 by passing through the penetration hole, so as to be delivered from the first separation device 13. On the other hand, the non-specified material which is relatively large among the acid containing aqueous solution including crushed matter 92 cannot pass through the penetration hole, and remains inside the first separation device 13 or is delivered through another route. Incidentally, those which are small among the crushed non-specified material cannot be completely separated at the first separation device 13, and are included in the acid containing first aqueous solution 93.

When a washing machine is used as the first separation device 13, as the size of the penetration hole of the washing tank which is to function as the sieve, in a case of round holes, 5 mm to 20 mmϕ may be mentioned, and in a case of holes with other shapes, the size with substantially the same area as the round hole may be mentioned.

The first dust removal process P14 is performed by the first dust removal device 14. The acid containing first aqueous solution 93 which has been delivered from the first separation device 13 is made to pass through a screen, so that the acid containing aqueous solution which includes pulp fibers and the acid inactivated superabsorbent polymers, and the crushed non-specified material (the foreign matter) are further separated. As a result, the crushed non-specified material (the foreign matter) cannot pass through the screen so as to be separated, and the acid containing second aqueous solution 94 is delivered from the first dust removal device 14. On the other hand, the crushed non-specified material (the foreign matter) cannot pass through the screen, and remains inside the first dust removal device 14 or is delivered through another route. Incidentally, those which are even smaller among the crushed non-specified material cannot be completely separated at the first dust removal device 14, and are included in the acid containing second aqueous solution 94.

The second dust removal process P15 is performed by the second dust removal device 15, and the acid containing second aqueous solution 94 which has been delivered from the first dust removal device 14 is made to pass through a screen, so that the acid containing aqueous solution which includes pulp fibers and the acid inactivated superabsorbent polymers, and the crushed non-specified material (the foreign matter) are further separated. As a result, the crushed non-specified material (the foreign matter) cannot pass through the screen so as to be separated, and the acid containing third aqueous solution 95 is delivered from the second dust removal device 15. On the other hand, the crushed non-specified material (the foreign matter) cannot pass through the screen, and remains inside the second dust removal device 15 or is delivered through another route. Incidentally, those which are even smaller among the crushed non-specified material cannot be completely separated at the second dust removal device 15, and are included in the acid containing third aqueous solution 95.

The third dust removal process P16 is performed by the third dust removal device 16, and the acid containing third aqueous solution 95 which has been delivered from the second dust removal device 15 is subjected to a centrifugal separation inside a conical housing placed in an up-side down manner, so that the acid containing aqueous solution which includes pulp fibers and the acid inactivated superabsorbent polymers, and the crushed non-specified material (the foreign matter) are even further separated. As a result, the acid containing fourth aqueous solution 96 is delivered from the upper portion of the third dust removal device 16 (the cyclone separating machine). On the other hand, the crushed non-specified material (the foreign matter), especially, heavy materials such as metal, etc., is delivered from the lower portion of third dust removal device 16 (the cyclone separating machine).

Incidentally, pH of the acid containing aqueous solution is adjusted so that the specific gravity and the size of the acid inactivated superabsorbent polymers and the specific gravity and the size of the pulp fibers are within a predetermined range.

The second separation process P17 is performed by the second separation device 17. The acid containing fourth aqueous solution 96 which has been delivered from the third dust removal device 16 is separated by a drum screen into the acid containing aqueous solution which includes the acid inactivated superabsorbent polymers and the acid containing aqueous solution 97 which mainly includes the pulp fibers. As a result, the acid containing aqueous solution which includes the acid inactivated superabsorbent polymers passes through the drum screen so as to be separated from the acid containing fourth aqueous solution 96, and is delivered from the second separation device 17. On the other hand, the acid containing aqueous solution 97 which mainly includes the pulp fibers among the acid containing fourth aqueous solution 96 cannot pass through the drum screen, and is delivered through another route from the second separation device 17.

The acid containing aqueous solution which includes the acid inactivated superabsorbent polymers is moved to the stirring machine altogether with the acid containing aqueous solution, and while stirring the acid containing aqueous solution which includes the acid inactivated superabsorbent polymers, sodium hydroxide aqueous solution, etc., is added to the stirring machine so as to adjust the pH, whereby the superabsorbent recycled polymers can be formed.

Further, the acid containing aqueous solution which includes the acid inactivated superabsorbent polymers is separated by using a solid-liquid separation machine, for example, a rotary drum screen, into the acid inactivated superabsorbent polymers and the acid containing aqueous solution, the separated acid inactivated superabsorbent polymers are moved to a stirring machine in which tap water, an alkaline aqueous solution, etc., are filled as the aqueous solution for regeneration, an alkali metal ion supply source is added so as to adjust the pH, whereby the wet-state superabsorbent recycled polymers can be formed.

Subsequently, the wet-state superabsorbent recycled polymers are dried by using a vacuum drying machine, then the thy-state superabsorbent recycled polymers are formed, and then the dry-state superabsorbent recycled polymers are for example crushed by using a crushing machine, so that particulate-state superabsorbent recycled polymers can be formed.

The third separation process S18 is performed by the third separation device 18. The acid containing aqueous solution 97 which mainly includes the pulp fibers delivered from the second separation device 17 is separated by a drum screen into the solid 98 which includes the pulp fibers and the acid inactivated superabsorbent polymers, and the liquid which includes the acid inactivated superabsorbent polymers and the acid containing aqueous solution. Further, together with the separation, the acid inactivated superabsorbent polymers within the solid 98 which includes the pulp fibers and the acid inactivated superabsorbent polymers are applied with pressure and are squashed. As a result, the liquid which includes the acid inactivated superabsorbent polymers and the acid containing aqueous solution passes through the drum screen so as to be separated from the acid containing aqueous solution 97 which mainly includes the pulp fibers and is delivered from the third separation device 18. On the other hand, the solid 98 which includes the pulp fibers and the acid inactivated superabsorbent polymers among the acid containing aqueous solution 97 which mainly includes the pulp fibers cannot pass through the drum screen, and is delivered to the outside of the third separation device 18 from the gap of the lid body at the tip portion of the drum screen.

The oxidizing agent treatment process S19 is performed by the oxidizing agent treatment device 19. The pulp fibers and the squashed acid inactivated superabsorbent polymers in the solid 98 which includes the pulp fibers and the acid inactivated superabsorbent polymers delivered from the third separation device 18 are treated by an aqueous solution which includes an oxidizing agent. Accordingly, the acid inactivated superabsorbent polymers are subjected to an oxidative decomposition so as to be removed from the pulp fibers. As a result, the acid inactivated superabsorbent polymers which have been attached to the pulp fibers in the solid 98 which includes the pulp fibers and the acid inactivated superabsorbent polymers (for example which have been remained on the surface of the pulp fibers) are subjected to the oxidative decomposition by an aqueous solution which includes an oxidizing agent, and change into an organic matter with a low molecular weight which is soluble in an aqueous solution, whereby are removed from the pulp fibers, so that a treatment solution 99 which includes the recycled pulp fibers is formed.

For example, in the oxidizing agent treatment device 19, the solid 98 which includes the pulp fibers and the acid inactivated superabsorbent polymers is thrown from the upper portion of the treatment tank and sinks from the upper portion toward the lower portion of the treatment solution, that is, the aqueous solution which includes the oxidizing agent. On the other hand, the ozone containing gas is continuously released front the nozzle in the treatment tank into the treatment solution in a state of fine bubbles (for example: microbubbles or nanobubbles). That is, the ozone containing gas rises front the lower portion to the upper portion of the treatment solution. Inside the treatment solution, the sinking pulp fibers and the rising ozone containing gas collide while traveling with facing each other. Further, the ozone containing gas is attached to the surface of the pulp fibers so as to wrap the pulp fibers. At this time, the ozone in the ozone containing gas reacts with the acid inactivated superabsorbent polymers in the pulp fibers, performs oxidative decomposition for the acid inactivated superabsorbent polymers, and let the acid inactivated superabsorbent polymers dissolve in the treatment solution. Accordingly, the acid inactivated superabsorbent polymers which are included in the pulp fibers in the solid 98 which includes the pulp fibers and the acid inactivated superabsorbent polymers are subjected to the oxidative decomposition, so as to be removed from the pulp fibers, whereby a treatment solution 99 which includes the recycled pulp fibers is formed.

The fourth separation process S20 is performed by the fourth separation device 20, and the treatment solution 99 which includes the recycled pulp fibers passes through a screen with a plurality of slits, whereby the recycled pulp fibers and the treatment solution are separated from the treatment solution 99 which includes the recycled pulp fibers. As a result, the treatment solution passes through the screen so as to be separated from the treatment solution 99 which includes the recycled pulp fibers, and is delivered front the fourth separation device 20. On the other hand, the recycled pulp fibers among the treatment solution 99 which includes the recycled pulp fibers cannot pass through the screen and remain in the fourth separation device 20 or is delivered through another route.

The superabsorbent recycled polymers which are formed by the manufacturing method of the present disclosure, the regenerating method of the present disclosure, and the use of the present disclosure can be used without being limited to the usage in which superabsorbent polymers are used, and for example, may be used for a sanitary product (for example, a disposable diaper, an incontinence pad (for example, a light incontinence pad), a disposable shorts, a sanitary napkin, a panty liner, a bed sheet), a pet sheet, cat sand, soil conditioning agent, etc.

EXAMPLES

Hereinbelow, the present disclosure is explained by mentioning examples, however, the present disclosure is not limited to these examples.

Example 1

Polyacrylic-based superabsorbent polymers (AQUA KEEP, manufactured by SUMITOMO SEIKA CHEMICALS CO., LTD., which were unused) were immersed in saline with the amount of 150 times by mass ratio for 10 minutes in a constant temperature and humidity chamber with the temperature: 25±5° C. and the humidity: 65±5% RH.

Incidentally, when the absorption magnification (saline) of the immersed superabsorbent polymers was measured in accordance with the method described in the present description, the absorption magnification (saline) was 86.6 (g/g).

Further, when "saline with the amount of 150 times by mass ratio" was changed to "deionized water with the amount of 1000 times by mass ratio", and the absorption magnification (deionized water) was measured, the absorption magnification (deionized water) was approximately 600 times (g/g).

450 g of the superabsorbent polymers extracted from saline were placed in a bag made of polytetrafluoroethylene, and were immersed in a citric acid aqueous solution (1000 mL, pH=2.52) for 5 minutes, whereby the acid inactivated superabsorbent polymers were prepared.

Figure 4:
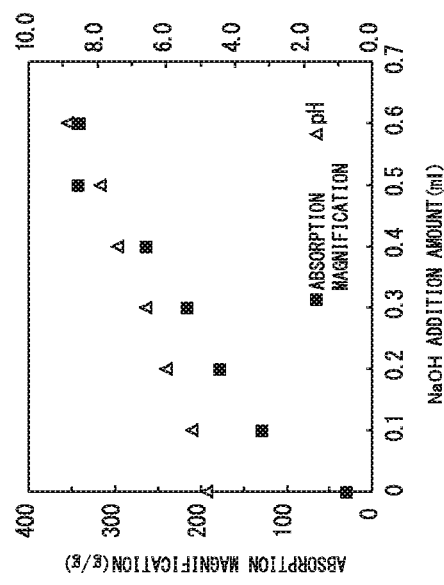
FIG. 4 is a diagram which shows the results of the examples.

Subsequently, the acid inactivated superabsorbent polymers were placed in 1 L beaker in which 500 mL of deionized water was filled as the aqueous solution for regeneration together with the bag, and while being stirred, 0.1 mL of 1.0 mol/L NaOH aqueous solution was added. 10 minutes after the addition of NaOH, the bag was extracted from the beaker, the pH of the aqueous solution for regeneration was measured, and the absorption magnification of the superabsorbent polymers (the superabsorbent recycled polymers) in the bag was measured. The results are shown in FIG. 4.

Examples 2 to 6

Figure 5:
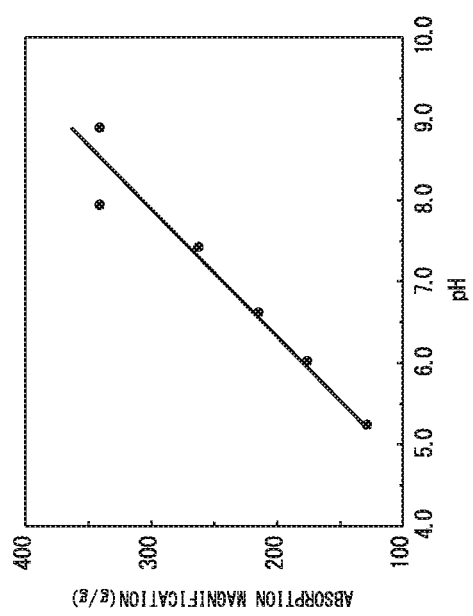
FIG. 5 is another diagram which shows the results of the examples.

In the same manlier as Example 1, except for changing the addition amount of 1.0 mol/L NaOH aqueous solution to 0.2 mL, 0.3 mL, 0.4 mL, 0.5 mL, and 0.6 mL, respectively, the pH of the aqueous solution for regeneration and the absorption magnification (g/g) of the superabsorbent polymers (the superabsorbent recycled polymers) were measured. The relationship between the addition amount of the NaOH aqueous solution, the pH, and the absorption magnification (g/g) is shown in FIG. 4, and the relationship between the pH and the absorption magnification (g/g) is shown in FIG. 5.

Reference Example 1

In Example 1, pH of the aqueous solution for regeneration before adding the NaOH aqueous solution was measured. The results as the value of pH when the amount of NaOH was 0 mL are shown in FIG. 4. Further, Example 1, the absorption magnification of the acid inactivated superabsorbent polymers before being placed in 1 L beaker in which deionized water was filled is shown in FIG. 4 as the absorption magnification when the amount of NaOH was 0 mL.

From FIG. 4, it can be understood that by adjusting the addition amount of the NaOH aqueous solution, the absorption magnification of the superabsorbent polymers (the superabsorbent recycled polymers) can be adjusted. Further, from FIG. 5, it can be understood that there is a high correlation between the pH of the aqueous solution for regeneration and the absorption property of the superabsorbent recycled polymers.

Example 7

Figure 6:
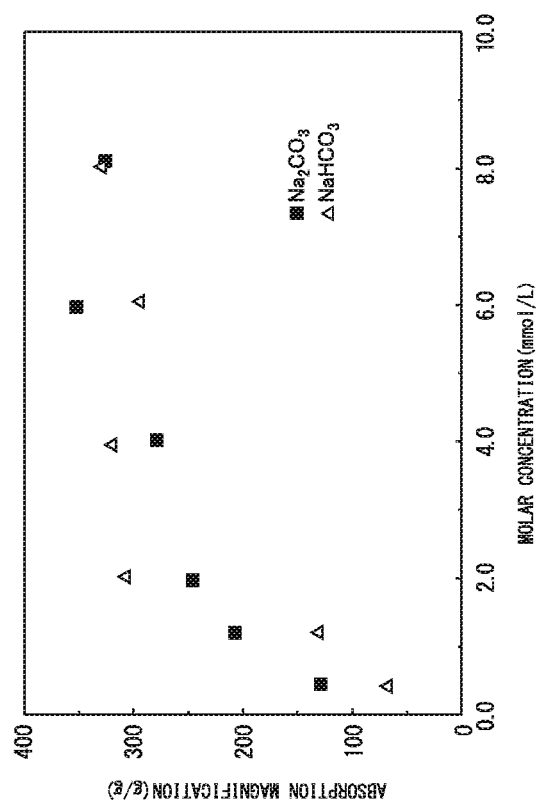
FIG. 6 is still another diagram which shows the results of the examples.

The acid inactivated superabsorbent polymers were prepared in accordance with Example 1, 450 g of the of the prepared acid inactivated superabsorbent polymers were placed in a bag made of polytetrafluoroethylene, the acid inactivated superabsorbent polymers were placed in 1 L beaker in which 500 mL of deionized water was filled together with the bag, and while being stirred, a predetermined amount of $Na_2CO_3$ was added, 10 minutes after the addition of $Na_2CO_3$, the bag was extracted from the beaker, and the absorption magnification of the superabsorbent polymers (the superabsorbent recycled polymers) in the bag was measured. The results are shown in FIG. 6. Incidentally, in Example 7, the experiment was perforated for a plurality of times by changing the predetermined amount of $Na_2CO_3$.

Incidentally, in FIG. 6, the horizontal axis is the molar concentration (mmol/L) of $Na_2CO_3$, and the vertical axis is the absorption magnification (g/g) of the superabsorbent recycled polymers.

Example 8

In accordance with Example 7, except for changing $Na_2CO_3$ to $NaHCO_3$, the absorption magnification of the superabsorbent polymers (the superabsorbent recycled polymers) was measured. The results are shown in FIG. 6. Incidentally, in FIG. 6, the horizontal axis is the molar concentration (mmol/L) of $NaHCO_3$.

Examples 9 to 13

Polyacrylic-based superabsorbent polymers (AQUA KEEP, manufactured by SUMITOMO SEIKA CHEMICALS CO., LTD., which were unused) were immersed in a container in which artificial urine (which was prepared by dissolving 200 g of urea, 80 g of sodium chloride, 8 g of magnesium sulfate, 3 g of calcium chloride, and approximately 1 g of a dye: blue No. 1 in 10 L of ion exchanged water) was filled (in the container, the artificial urine with the amount of approximately 1000 times by ratio of the unused superabsorbent polymers was filled) for 30 minutes in a constant temperature and humidity chamber with the temperature: 25±5° C. and the humidity 65±5% RH, and the superabsorbent polymers after immersion were placed still on a net for 10 minutes.

The superabsorbent polymers after being placed still were immersed in a container in which 1 mass % of citric acid aqueous solution was filled (in the container, the citric acid aqueous solution with the amount of approximately 1000 times by ratio of the unused superabsorbent polymers was filled) for 30 minutes, and the superabsorbent polymers after immersion were placed still on a net for 10 minutes. The superabsorbent polymers after being placed still was immersed in a container in which 20 mmol/L of NaOH aqueous solution was filled (in the container, the NaOH aqueous solution with the amount of approximately 1000 times by ratio of the unused superabsorbent polymers was filled) for 30 minutes, and the superabsorbent polymers after immersion (the wet-state superabsorbent recycled polymers) were placed still on a net for 10 minutes, whereby the wet-state superabsorbent recycled polymers were obtained. A portion of the wet-state superabsorbent recycled polymers were sampled, and when the absorption magnification (after regeneration) was measured, it was 201.0 times.

A portion of the wet-state superabsorbent recycled polymers was immersed in each of the containers in which a hydrophilic organic solvent was filled (in each of the containers, the hydrophilic organic solvent with the amount of approximately 600 times by ratio of the unused superabsorbent polymers was filled) for 30 minutes, whereby was dehydrated, and the superabsorbent recycled polymers after dehydration were placed still on a net for 10 minutes, and the absorption magnification (after dehydration) of the superabsorbent recycled polymers after being placed still was measured. The results are shown in Table 1.

Incidentally, the used hydrophilic organic solvent was methanol, ethanol, acetone or acetonitrile, and as a comparison, the one which was not immersed in a hydrophilic organic solvent was prepared.

The wet-state superabsorbent recycled polymers after being placed still were dried at 60° C. for 24 hours, and the thy-state superabsorbent recycled polymers were obtained.

The dry-state superabsorbent recycled polymers were immersed in a container in which deionized water was filled (in the container, the deionized water with the amount of approximately 1000 times by ratio of the unused superabsorbent polymers was filled) for 30 minutes, and the superabsorbent recycled polymers after immersion were placed still on a net for 10 minutes, and the absorption magnification (after drying) was measured. The results are shown in Table 1.

TABLE 1

| | Example No. | | | | |
|---|---|---|---|---|---|
| | Example 9 | Example 10 | Example 11 | Example 12 | Example 13 |
| hydrophilic organic solvent | methanol | ethanol | acetone | acetonitrile | — |
| absorption magnification (after regeneration) | | | 201.0 | | |
| absorption magnification (after dehydration) | 36.2 | 21.7 | 20.5 | 37.4 | — |
| absorption magnification (after drying) | 319.5 | 329.9 | 338.6 | 320.7 | 330.0 |

From Table 1, it can be understood that the superabsorbent recycled polymers in which dehydration was performed by a hydrophilic solvent (Examples 9 to 12) have the similar absorption magnification (after drying) as the superabsorbent polymers in which dehydration was not performed by a hydrophilic solvent (Example 13).

REFERENCE SIGNS LIST

1 system
11 rupturing device
12 crushing device
13 first separation device
14 first dust removal device
15 second dust removal device
16 third dust removal device
17 second separation device
18 third separation device
19 oxidizing agent treatment device
20 fourth separation device
S1 inactivation step
S2 removal step
S3 superabsorbent recycled polymer formation step
S4 recycled pulp fiber recovery step
P11 hole portion formation process
P12 crushing process
P13 first separation process
P14 first dust removal process
P15 second dust removal process
P16 third dust removal process
P17 second separation process
P18 third separation process
P19 oxidizing agent treatment process
P20 fourth separation process

The invention claimed is:

1. A method of regenerating superabsorbent polymers which have been inactivated by an acid into superabsorbent recycled polymers which have a predetermined absorption property, the method comprising:
   a preparation step of preparing the superabsorbent polymers having an acid group and having been inactivated by the acid,
   a superabsorbent recycled polymer formation step of forming wet-state superabsorbent recycled polymers from the superabsorbent polymers which have been inactivated by the acid, by adding an alkali metal ion supply source which is capable of supplying an alkali metal ion to an aqueous solution for regeneration which includes the superabsorbent polymers which have been inactivated by the acid, and a drying step of forming the superabsorbent recycled polymers which have the predetermined absorption property by drying the wet-state superabsorbent recycled polymers, wherein the predetermined absorption property is adjusted by controlling a pH of the aqueous solution for regeneration, wherein the pH of the aqueous solution for regeneration is adjusted to 5.0 to 9.0 at 25° C., and the predetermined absorption property is any value of an absorption magnification of 100 to 400 times (g/g) with respect to deionization.

2. The method according to claim 1, wherein
the alkali metal ion supply source is a hydroxide of an alkali metal or a salt of a hydroxide of an alkali metal and an acid which has an acid dissociation constant larger than that of the acid group of the superabsorbent polymers.

3. The method according to claim 1, the alkali metal ion is selected from a group of a lithium ion, a sodium ion, a potassium ion, and any combination thereof.

4. A method of manufacturing superabsorbent recycled polymers which have a predetermined absorption property from a used sanitary product which includes pulp fibers and superabsorbent polymers, the method comprising:

an inactivation step of forming superabsorbent polymers which have been inactivated by an acid by immersing, in an acid containing aqueous solution which includes the acid, a sanitary product configurational material which configures the sanitary product which includes the pulp fibers and the superabsorbent polymers having an acid group, a superabsorbent recycled polymer formation step of forming wet-state superabsorbent recycled polymers from the superabsorbent polymers which have been inactivated by the acid, by adding an alkali metal ion supply source which is capable of supplying an alkali metal ion to an aqueous solution for regeneration which includes the superabsorbent polymers which have been inactivated by the acid, and a drying step of forming the superabsorbent recycled polymers which have the predetermined absorption property by drying the wet-state superabsorbent recycled polymers, wherein the predetermined absorption property is adjusted by controlling a pH of the aqueous solution for regeneration, wherein the pH of the aqueous solution for regeneration is adjusted to 5.0 to 9.0 at 25° C., and the predetermined absorption property is any value of an absorption magnification of 100 to 400 times (g/g) with respect to deionization.

5. The method according to claim 4, wherein
the alkali metal ion supply source is a hydroxide of an alkali metal or a salt of a hydroxide of an alkali metal and an acid which has an acid dissociation constant larger than that of the acid group of the superabsorbent polymers.

6. The method according to claim 4, wherein
in the superabsorbent recycled polymer formation step, the acid containing aqueous solution is used as the aqueous solution for regeneration, and the pH of the aqueous solution for regeneration is adjusted to 5.0 to 7.0 (at 25° C.).

7. The method according to claim 4, wherein
the aqueous solution for regeneration is a neutral aqueous solution or an alkaline aqueous solution, and
in the superabsorbent recycled polymer formation step, the superabsorbent polymers which have been inactivated by the acid are immersed in the aqueous solution for regeneration, and the pH of the aqueous solution for regeneration is adjusted to higher than 7.0 and 9.0 or lower.

* * * * *